United States Patent [19]  
Ecord et al.

[11] 4,358,486  
[45] Nov. 9, 1982

[54] DENSIFICATION OF POROUS REFRACTORY SUBSTRATES

[75] Inventors: Glenn M. Ecord; Calvin Schomburg, both of Houston, Tex.

[73] Assignee: The United States of America as represented by the Administrator of the National Aeronautics and Space Administration, Washington, D.C.

[21] Appl. No.: 266,256

[22] Filed: May 22, 1981

[51] Int. Cl.$^3$ ............................ B32B 7/02; B05D 3/02
[52] U.S. Cl. .................................... 427/379; 427/384; 427/387; 428/218
[58] Field of Search .................... 427/140, 397.7, 379, 427/402, 384, 387; 428/49, 218, 446

[56] References Cited

U.S. PATENT DOCUMENTS 4,093,771 6/1978 Fletcher .......................... 427/380 X
4,124,732 11/1978 Leger ............................... 428/49 X

OTHER PUBLICATIONS

Berger, Dean M., *Alkyl & Polyol Silicate Zinc-Rich Primers*, Apr., 1979.

Primary Examiner—Michael R. Lusignan
Attorney, Agent, or Firm—Russell E. Schlorff; John R. Manning; Marvin F. Matthews

[57] ABSTRACT

A hydrolyzed tetraethyl orthosilicate is applied to the surface of a porous refractory substrate following which the substrate is heated to a temperature and for a period of time sufficient to bond the silica released from the tetraethyl orthosilicate to the substrate thereby densifying and strengthening the surface.

12 Claims, No Drawings

DENSIFICATION OF POROUS REFRACTORY SUBSTRATES

DESCRIPTION

ORIGIN OF THE INVENTION

The invention described herein was made by employees of the United States Government and may be manufactured and used by or for the Government of the United States of America for governmental purposes without the payment of any royalties thereon or therefor.

RELATED APPLICATION

The application is related to Ser. No. 217,336 filed Dec. 17, 1980 and entitled "Attachment System For Silica Tiles" and to an application entitled "Method Of Repairing Surface Damage To Porous Refractory Substrates", filed contemporaneously herewith, and now U.S. Pat. No. 4,338,368, patented July 6, 1982.

BACKGROUND OF THE INVENTION

The present invention relates to a method for densifying a porous refractory substrate so as to provide a high strength surface having increased flatwise tensile strength.

Portions of the space shuttle orbiter, which is subject to temperatures ranging from −250° F. to 2300° F., utilize tiles formed of substantially chemically pure silica fibers which are rigidized with a high purity silica binder. The tiles, known as LI-900 and LI-2200, are manufactured by Lockheed Missles and Space Company, Inc., have a density of 9 pounds and 22 pounds per cubic foot respectively, relatively low strength, extremely high temperature resistance, and an extremely low coefficient of thermal expansion as compared to metals. As disclosed in U.S. Pat. No. 4,124,732, incorporated herein by reference for all purposes, the tiles are secured to the space shuttle orbiter by means of a strain isolator pad which is interposed between the tiles and the surface of the structure to be protected. It has been found that the tiles currently used having a density of 9 pounds per cubic foot are subject to interfacial tile-isolator pad failure at about 11 psi of flatwise tensile stress. Interfacial bond failure is caused by uneven tension exerted by the strain isolator pad. Accordingly, if the surface of the tile at the tile-strain isolator pad interface were of higher strength and the bond between the tile and the isolator pad increased, any failure caused by flatwise tensile stress could be shifted into the body of the tile thus achieving the highest possible flatwise tensile strength in the interfacial bond.

U.S. Pat. No. 4,124,732 teaches a method of securing the tiles to a surface of a structure sought to be protected. U.S. Pat. No. 2,791,262 discloses a process for improving the physical characteristics of sheet form which includes the steps of forming a mixture of mica pulp and hydrolyzed ethyl orthosilicate and forming a sheet from the above mixture by curing. U.S. Pat. No. 3,702,279 discloses a method for forming low density insulation comprising the steps of molding a slurry of inorganic fibers, impregnating the molded fiberous mass with a binder of an inorganic sol, gelatinizing the sol, curing the gelatinized binder, drying the composite and firing the composite to sinter the binder. The patent discloses the preparation of the silica sol from ethyl silicate, ethyl alcohol and HCL. None of the references discussed above, which are believed by applicants to be the most pertinent, teach a method of locally densifying a porous refractory or ceramic material whereby the bond between such material and the surface to which it is attached may be increased to the point such that any failure caused by flatwise tensile pressure is shifted from the attached surface area into the body of the material.

SUMMARY OF THE INVENTION

It is therefore an object of the present invention to provide a method of densifying and strengthening the surface of a porous refractory or ceramic substrate. This densification also serves to make the surface harder, more resistant to damage or erosion and provides a strong, supportive base for application of a subsequent surface coating. This will make a delicate subsequent coating less susceptible to damage.

Another object of the present invention is to provide a method whereby interfacial failure caused by flatwise tensile stress between the refractory substrate and a non-rigid attachment surface can be reduced.

Yet another object of the present invention is to provide a method whereby the interfacial bond between a refractory or ceramic substrate and an attachment surface exhibits a flatwise tensile strength equal to that of the substrate itself.

Yet another object of the present invention is to reinforce selected areas or volumes within a refractory or ceramic material which require additional strength to retain fasteners or other inserted devices.

The above objects of the present invention will become apparent from the description and the appended claims.

In the method of the present invention, a surface of a porous refractory or ceramic substrate is coated with a hydrolyzed tetraethyl orthosilicate (TEOS) following which the coated substrate is dried, at elevated temperatures, to cure the substrate and bond the silica released from the TEOS to the substrate. Optionally, a dye may be used which serves the purpose of indicating uniform penetration of the hydrolyzed TEOS into the surface of the substrate.

In a preferred form of the method wherein reusable surface insulation (RSI) tiles such as LI-900 tiles are being densified, the coating and curing steps described above are repeated until the desired degree of densification is achieved.

DESCRIPTION OF PREFERRED EMBODIMENTS

While the invention will be described with particular reference to the densification of an RSI tile used on the spacecraft, it is to be understood that the technique described herein has application in the local densification and bonding of virtually any foamed, fibrous or otherwise porous ceramic or refractory material which is to be bonded to a non-rigid surface such that the bonding between the non-rigid surface and the ceramic or refractory material is subject to failure brought on by uneven tension exerted by the non-rigid surface. The method of the present invention also has application in the finishing of surfaces used in high temperature environments such as furnaces and the like.

The RSI tiles used on the space shuttle orbiter are approximately 6×6 inches with varying thickness and density depending upon specific vehicle locations and heat load. For example, the RSI tiles can have a density ranging from about 9 pounds per cubic foot to about 22 pounds per cubic foot.

TEOS which has the formula $(C_2H_5)_4SiO_4$, is hydrolyzed in aqueous mediums such as acidified water to form an adhesive type of silica. A particularly desirable form of TEOS which has been used in the method of the present invention is known as Silbond Condensed Grade Ethyl Silicate marketed by Stauffer Chemical Company. In the method of the present invention, the TEOS can be hydrolyzed by mixing together 100 parts by volume TEOS and 22 parts by volume 0.05 N hydrochloric acid solution. For each 244 ml of TEOS/HCL mixture, one drop of a suitable dye may be added. The dye, which can be any material which does not interfere with the hydrolysis of the TEOS or the densification procedure, aids in the observation of homogenization or the end point for mixing the TEOS and the HCL solution. It also serves the purpose of indicating that a uniform layer of the hydrolyzed TEOS has been applied to the substrate surface. The "end point" referred to above is the point at which the mixture of the TEOS and HCL solution is homogeneous and clear, albeit tinted by the dye if used, there being no indication of stratification in the mixture on standing. Generally speaking, this end point is reached after thirty to forty five minutes of mixing TEOS and HCL solution using a typical laboratory magnetic stirrer.

The surface to be densified should be cleaned of loose particles by using dry air or other suitable gas. The hydrolyzed TEOS can be applied using a brush, spray or other suitable means which will provide a uniform, even coating penetrating the surface of the substrate. Generally speaking, the amount of hydrolyzed TEOS added to the surface of the substrate will be such as to provide an interfacial bond strength between the substrate and a non-rigid attachment surface which is substantially equal to the actual substrate strength where the strength referred to is resistance to flatwise tensile stress. Following addition of the hydrolyzed TEOS to the substrate, it is uniformly cured at a temperature of around 260° F. for a period of time sufficient to ensure adhesion of the silica released from the TEOS to the substrate. Generally speaking, about a half hour of curing time is sufficient.

As utilized in the densification of LI-900 and LI-2200 tiles i.e. RSI tiles to be used on the space shuttle orbiter, the following technique (Technique A) has been found to be quite successful: hydrolyzed TEOS, prepared as described above, is applied to the surface of the tile in an average amount of 0.25 cc/cm$^2$. The tile is then baked at 260° F.±10° F. for a half hour and cooled to room temperature. A second application of the hydrolyzed TEOS is applied to the surface in an average amount of 0.25 cc/cm$^2$. The tile is again baked to 350° F.±10° F. for a half hour and the temperature then raised to 600° F.±10° F. for an additional half hour. The tile is then cooled to room temperature. At this point, the average weight increase of the tile should be in the range of 0.08 to 0.12 grams/cm$^2$ of densified surface. If additional densification is desired it can be carried out as per the procedure described for the second application of the TEOS to the tile (Technique B). It has also been found that for purposes of the orbiter tile application the 600° F. bake after application is unnecessary.

It has been found that in the case of the RSI tile, for effective bonding to the strain isolator pad, i.e. to achieve a bond which would insure interfacial system failure equal to the full strength of the tile, a densified layer approximately 0.2 inches deep having a minimum density of 2.5 grams/in$^3$ is desirable.

To enhance densified properties, where necessary or desirable, the hydrolyzed TEOS can be combined with any water compatible refractory or ceramic additive such as for example, silica slips of the type disclosed in copending U.S. Patent Application Ser. No. 217,336 filed Dec. 17, 1980 and entitled "Attachment System For Silica Tiles."

The densification method described herein results in the deposition of a pure form of silica within the voids of the substrate which it is believed attaches at the fiber intersections to effectively densify and strengthen the mass treated. The coefficient of thermal expansion of the densification has been demonstrated compatible with the RSI tile material by the absence of cracking after twenty thermal cycles ranging from −240° F. to 600° F. and by tests demonstrating full tile strength capability after ten thermal cycles were applied to various test specimens.

To more fully demonstrate the present invention, the following non-limiting examples are presented. In all cases, the hydrolyzed TEOS was prepared as described above using 0.05 N hydrochloric acid as the hydrolyzing agent. The TEOS was applied to the tile surfaces by brushing. A modification of the ASTM-D-297 flatwise tensile bond strength test method was employed. In the tensile test method, the strain isolator pad disclosed in U.S. Pat. No. 4,124,732 is bonded to an aluminum base plate and to the densified surface of the tile. An aluminum pull plate is then bonded to the other surface of the densified tile. Tensile stress is then applied to the aluminum pull plate and the failure location and tensile stress at failure noted.

EXAMPLE 1

In this example, eleven tests specimens of RSI LI-900 tiles measuring 2×2×1 inches were densified with TEOS with different density levels. The densified tiles were exposed to 600° F. for one hour and then subjected to the flatwise tensile bond strength test. The data are shown in Table 1 below.

TABLE I

| Sample | TEOS Density g./in$^2$ Surface | Coats of TEOS | 600° F.-1 HR | PSI Failure | Location |
|---|---|---|---|---|---|
| 1 | 0.5 | 2 | Yes | 24.0 | Tile |
| 2 | 0.5 | 2 | Yes | 16.0 | Tile |
| 3 | 0.5 | 2 | Yes | 16.0 | Tile |
| 4 | 0.5 | 2 | No | 19.5 | Tile |
| 5 | 0.5 | 2 | No | 22.0 | Tile |
| 6 | 0.5 | 2 | No | Not Tested | |
| 7 | 0.3 | 1 | Yes | 10.8 | Tile Interface |
| 8 | 0.3 | 1 | Yes | 13.0 | Tile Interface |
| 9 | 0.3 | 1 | No | 17.5 | Tile Interface |
| 10 | 0.3 | 1 | No | 23.8 | Tile |
| 11 | 0.3 | 1 | No | 20.0 | Tile |

As can be seen from the data in Table 1, samples 7, 8 and 9 (low densification) failed at the interface between the tile and strain isolator pad. In general, however, the data demonstrates that densification of the RSI tiles is a controllable, repeatable process and that densities of about 0.5 g/in$^2$ or higher result in achieving full tile strength capacity.

EXAMPLE 2

To establish the optimum density of impregnation (performance after thermal cycling) additional tests on 2×2×1 tile specimens were conducted. In Table II below, samples 1.1, 1.2 and 1.3 were subjected to a single densification procedure i.e. a single coating, and the tile was heated at 350° F. for one hour followed by heating at 600° F. for one half hour. In sample 4.1-4.6, two densification cycles (Technique A) were conducted, in each case the tiles being heated to 350° F. for one hour followed by heating at 600° F. for one half hour. In sample 7.1, three densification cycles were conducted on the tile, after each coating of TEOS, the tile being heated to 350° F. for one hour. In samples 7.2-7.10 three densification cycles (Technique B) were also conducted, the tiles being heated initially at 350° F. for one hour followed by heating at 600° F. for one half hour. In all cases, strength data was determined at room temperature after all tiles had been exposed to a thermal cycle from −240° F. to 600° F. The data are shown in Table II below.

TABLE II

| Sample | TEOS Density g/in$^2$ Surface | PSI Failure | Location |
| --- | --- | --- | --- |
| 1.1 | 0.35 | 14.3 | Tile |
| 1.2 | 0.35 | 12.8 | Tile |
| 1.3 | 0.35 | 15.3 | Tile |
| 4.1 | 0.50 | 17.3 | Tile |
| 4.2 | 0.50 | 22.0 | Tile |
| 4.3 | 0.50 | 30.5 | Tile Interface |
| 4.4 | 0.60 | 19.5 | Tile |
| 4.5 | 0.60 | 21.7 | Tile |
| 4.6 | 0.60 | 26.5 | Tile |
| 7.1 | 0.80 | 29.8 | Tile |
| 7.2 | 0.80 | 29.8 | Tile |
| 7.3 | 0.80 | 26.0 | Tile |
| 7.4 | 0.80 | 30.5 | Tile |
| 7.5 | 0.80 | 24.3 | Tile |
| 7.6 | 0.80 | 26.8 | Tile |
| 7.7 | 0.80 | 30.8 | Tile |
| 7.8 | 0.80 | 24.0 | Tile |
| 7.9 | 0.80 | 21.3 | Tile |
| 7.10 | 0.80 | 24.5 | Tile |

EXAMPLE 3

In this example, six 6×6×1 inch LI-900 tile specimens were prepared for testing using the three application densification technique used on specimen 7.1 through 7.10 in Example 2. The six RSI tiles were densified in two ways. The series 55 tiles were densified only in the areas covered by the strain isolator pad. The series 66 tiles were densified over the entire base of the tile. All six tiles used 0.160 inch thick strain isolator pad and were thermally cycled from −240° F. to 600° F. one time prior to tensile tests. The test results are shown in Table III below.

TABLE III

| Sample | PSI Failure | Failure Location |
| --- | --- | --- |
| 55-1 | 19.3 | Mid Tile* |
| 55-2 | 27.8 | Mid Tile |
| 55-3 | 23.4 | Mid Tile |
| 66-1 | 23.8 | Mid Tile |
| 66-2 | 25.7 | Mid Tile |
| 66-3 | 30.4 | Mid Tile |

*This specimen visually loaded unevenly

This example demonstrates that full tile strength at the interfacial tile/strain isolator pad is obtained on the 6×6 tiles. The data in Table III further shows that it is only necessary to densify the area under the strain isolator pad to attain full system strength.

EXAMPLE 4

The procedure of Example 3 was followed with the exception that the strain isolator pad had a thickness of 0.090 inches. The results are shown in Table IV.

TABLE IV

| Sample | PSI Failure | Failure Location |
| --- | --- | --- |
| 1 | 26.8 | Mid Tile |
| 2 | 24.1 | Mid Tile |
| 3 | 24.8 | Mid Tile |
| 4 | 22.0 | Mid Tile |
| 5 | 24.6 | Mid Tile |
| 6 | 31.6 | Mid Tile |

The data in Table IV clearly demonstrates that the TEOS densification achieves full system strength using a 0.090 thick strain isolator pad material and further shows a densification of only the area of the tile which contacts the strain isolator pad is required.

EXAMPLE 5

Five 2×2×1 inch LI-900 RSI tiles were densified as per the procedure of 7.1-7.10 in Example 2 following which they were cycled ten times from −240° F. to 600° F. and then tensile tested. The results are shown in Table V below.

TABLE V

| Sample | PSI Failure | Failure Location |
| --- | --- | --- |
| 1 | 18.5 | Tile |
| 2 | 25.0 | Tile |
| 3 | 26.0 | Tile |
| 4 | 24.0 | Tile |
| 5 | 27.5 | Tile |

The data in Table V clearly show that ten thermal cycles do not reduce the strengthening effect of the TEOS densification.

The method of the present invention permits penetration of the densifying agent into a tile or tile like material from full penetration (saturation) to a controlled localized densification depth. The density and location of the penetrated volumes can be easily adjusted to fit any application allowing for optimization of weight increases in the tile, i.e. the refractory substrate. Selected areas of tiles can be densified to provide stronger and stiffer tile properties and more durable surfaces or supporting bases for additional requirements such as tighter retention or support of reflective coatings can be achieved. The latter capability has been demonstrated using LI-900 tiles and the associated silicon tetraboride glass coating disclosed in U.S. Pat. No. 4,093,771, incorporated herein for all purposes. A tenfold increase in damage resistance was achieved. The process is particularly useful in providing a localized strengthening area for containing an auger attaching means such as disclosed in U.S. Pat. No. 3,936,927 "Auger Attachment Method For Insulation" incorporated herein for all purposes. While the invention has been described with particular reference to the densification of so called LI-900 RSI tiles, it finds equal application to the densification of denser tiles, as for example, tiles designated as LI-2200, disclosed in U.S. Pat. No. 3,952,083, incorporated herein for all purposes, or FRCI tiles disclosed in U.S. Pat. No. 4,124,732, incorporated herein for all purposes.

The foregoing disclosure and description of the invention is illustrative and explanatory thereof, and various changes in the method steps may be made within the scope of the appended claims without departing from the spirit of the invention.

We claim:

1. A method of densifying a porous refractory substrate comprising penetrating a surface of said substrate with a densifying agent comprised of a hydrolyzed tetraethyl orthosilicate, and heating said substrate at an elevated temperature and for a period of time sufficient to bond silica released from said densifying agent to said substrate.

2. The method of claim 1 wherein said substrate comprises silica fibers rigidized with a high purity silica binder.

3. The method of claim 2 wherein:
    a. applying a first coating of said densifying agent to said substrate in an amount of about 0.25 cc/cm$^2$ of surface area;
    b. heating said substrate to a temperature of about 260° F. for a period of time to bond silica released from said densifying agent to said substrate;
    c. applying a second coating of said densifying agent to said substrate in an amount of about 0.25 cc/cm$^2$ of surface area;
    d. heating said substrate to a temperature of about 350° F. for a period of time sufficient to bond silica released from said densifying agent to said substrate.

4. The method of claim 3 wherein said densifying agent penetrates said substrate to a depth of about 0.125 inches.

5. The method of claim 3 wherein steps c and d or variations thereof are repeated.

6. The method of claim 2 wherein the amount of said densifying agent applied to said substrate is such as to provide a total average weight increase of greater than about 0.12 grams/square centimeter of densified surface.

7. The method of claim 1 wherein said densifying agent contains a dye.

8. The method of claim 1 wherein said densifying agent is prepared by admixing said tetraethyl orthosilicate and 0.05 N hydrochloric acid solution in a ratio of 100 parts by volume of said tetraethyl orthosilicate to 22 parts by volume of said hydrochloric acid solution, and admixing said tetraethyl orthosilicate and said hydrochloric acid solution until a clear liquid is obtained.

9. The method of claim 8 wherein said densifying agent contains a dye.

10. The method of claim 1 wherein the densified substrate is used as a base for subsequent coatings or covers.

11. The method of claim 1 wherein the densified substrate is used for increased hardness or damage resistance of the softer original refractory.

12. The method of claim 1 wherein a densified area or volume is used as a bearing or loading surface to prevent pullout of fasteners or other inserted devices.

* * * * *